Aug. 27, 1968  T. P. FLEER  3,398,890
FAIL-SAFE REGULATOR FOR GAS-OVEN BURNERS
Filed Oct. 3, 1966  3 Sheets-Sheet 1
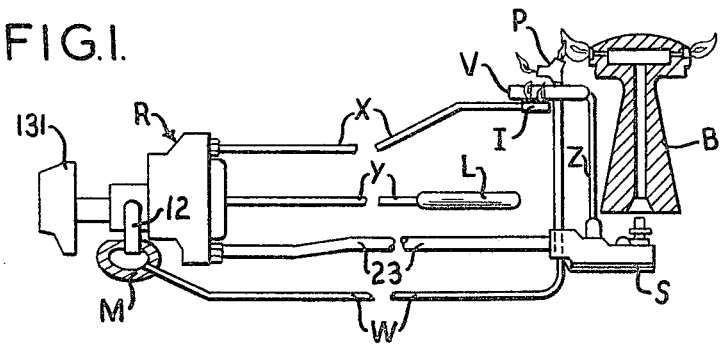
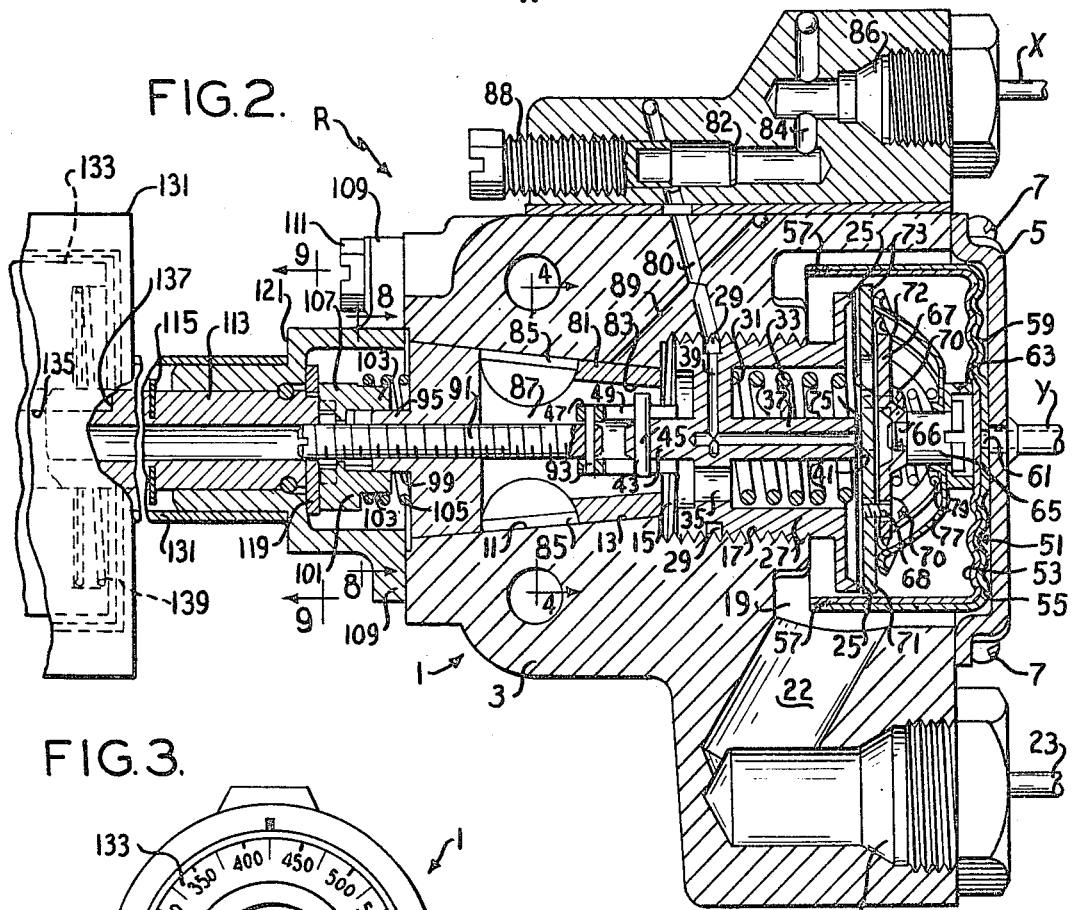
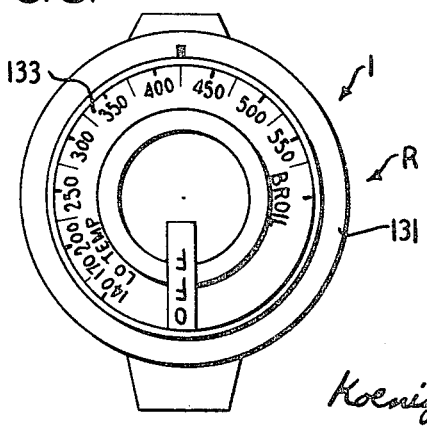
Thomas P. Fleer,
Inventor.
Koenig, Senniger, Powers and Leavitt,
Attorneys.

United States Patent Office 3,398,890
Patented Aug. 27, 1968

3,398,890
FAIL-SAFE REGULATOR FOR GAS-OVEN BURNERS
Thomas P. Fleer, St. Louis, Mo., assignor to Aurora Corporation of Illinois, Chicago, Ill., a corporation of Illinois
Filed Oct. 3, 1966, Ser. No. 583,793
1 Claim. (Cl. 236—15)

ABSTRACT OF THE DISCLOSURE

An improvement in a gas regulating system for ovens in which a burner is supplied with gas through a safety valve. Regulator means in a housing supplies gas to the safety valve. The burner is provided with a constantly burning pilot light and a cycling pilot light. The latter controls the operation of the safety valve through heating of a fluid-filled temperature-responsive system which connects them. The regulating means is under control of another fluid-filled temperature-responsive system heated by the burner. Said regulating means controls the operation of the cycling pilot. A by-pass extends around the said regulating means for converting the cycling pilot to a constant burning pilot. This by-pass is under control of a manually controlled valve which is operable in conjunction with the regulating means. The regulating means includes a double-seated member threaded into the housing for controlling flow of gas both to the cycling pilot and to the safety valve. A first ported valve member engages and disengages said seats. A second valve member has lost-motion with respect to the first valve member to engage and disengage it so as to cover and uncover its ports. The fluid-filled system responsive to the burner temperature is arranged with spring connections with both of said valves. These are arranged so that the first valve member initially engages the double seats, after which the second valve member engages the first valve member to cover its ports, the arrangement being such that if the safety valve fails all gas supply to the burner will be cut off at a temperature not much in excess of the normal temperature setting of the burner.

---

Among the several objects of this invention may be noted the provision of a regulator for controlling flow of gas to a control valve and a gas burner wherein the regulator automatically reduces gas flow to the burner if the control valve fails to close, thereby avoiding an excessive increase in oven temperature; the provision of a regulator of the class described which obtains intermittent burner operation at certain settings, modulating burner operation at another setting, and wherein modulating burner operation occurs on failure of the control valve to close at any setting. Other objects and features will be in part apparent and in part pointed out hereinafter.

The invention accordingly comprises the constructions hereinafter described, the scope of the invention being indicated in the following claim.

In the accompanying drawings, in which one of various possible embodiments of the invention is illustrated, FIG. 1 is a diagrammatic view illustrating how various burner and control parts are connected to form a complete regulating system for carrying out the invention;

FIG. 2 is an axial section of a regulator made according to the invention;

FIG. 3 is a left end view of FIG. 2 showing an adjustment of a control knob to an intermediate position for baking;

Figures 10, 11:
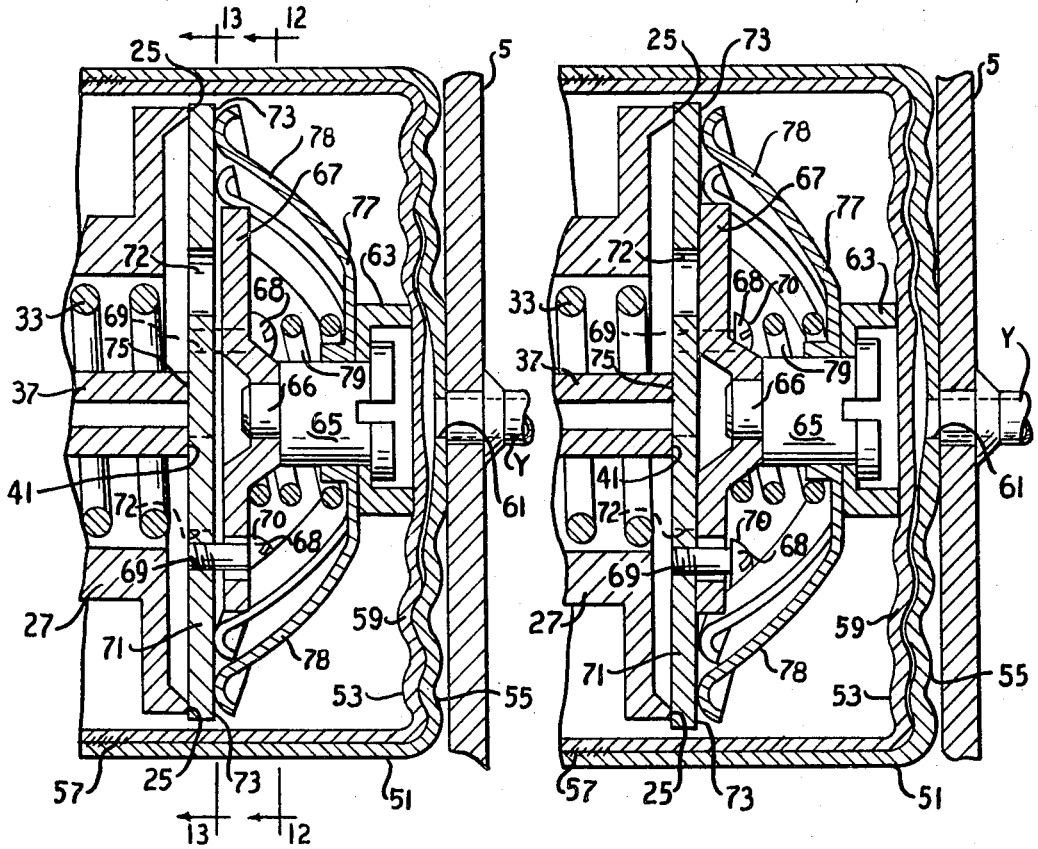
Figure 12:
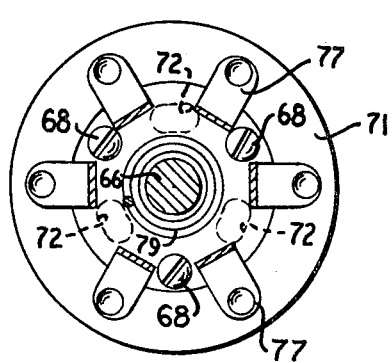
Figure 13:
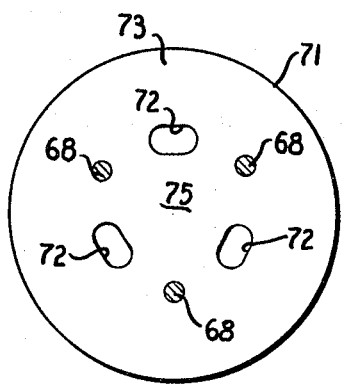

FIGS. 10 and 11 are enlarged fragmentary sections showing moved positions of thermostatically operated valve structure; and FIGS. 12 and 13 are fragmentary sections taken along lines 12—12 and 13—13, respectively, of FIG. 10.

Corresponding reference characters indicate corresponding parts throughout the several views of the drawings.

Although the invention described herein has general uses, a particular use is for thermostatic gas valves for oven temperature control of cooking ranges, in relation to which the invention will be described as an example.

In an oven served by the invention, a main burner serves both its baking and broiler heating sections. Baking is generally accomplished in a temperature range of approximately 250° F. to 550° F. This baking range is below the broiling temperature, which is above 550° F. and on the order of 575° F. to 600° F. Baking in the baking range is advantageously accomplished under intermittent burner control which alternately ignites and completely shuts off the burner. This is sometimes known as on-off or discontinuous regulation. As is known, by means of such regulation better baking is accomplished. For example, baked objects brown better under such regulation.

On the other hand, broiling is better accomplished when the burner is continuously modulated without ever being extinguished. A reason for this is that it is desired that smoke from broiling objects shall at all times be consumed by the flame. This is possible only when the burner is ignited during the entire period that an object is being broiled.

Referring now more particularly to the drawings, FIGS. 1-3 show among other things what will hereinafter be referred to as the main gas-enclosing regulator body assembly R. In FIG. 1 is shown a main oven burner B. An operating control valve construction for burner B is designated S. Valve S may be substantially the same as the correspond valve shown in the Holzboog et al. United States Patent 3,065,913, issued Nov. 27, 1962. Further description is therefore unnecessary. A continuously or constantly burning pilot burner P serves to ignite the burner B and to ignite a cycling pilot burner I. A fluid-filled temperature-responsive bulb L serves regulator R and is suitably located in the oven to be heated by burner B. Device V is another fluid-filled temperature-responsive bulb serving the safety and control valve S. Control valve S is closed when bulb V is cold and opens upon sufficient heating of bulb V. The cyclically ignited or intermittent pilot burner I is in effective heat-exchange relationship with the bulb V, but the continuously ignited or continuous pilot burner P is not. The continuous pilot burner P serves only for ignition of burner B and for ignition of the intermittent pilot burner I. Letter M designates the main gas line serving the apparatus. This is connected with the constantly burning pilot P by a line W. The line W may be directly connected to the main line as shown or this connection may be effected through suitable passages in the regulator R. The intermittent pilot I is connected with the regulator R through a gas line X. The bulb L is connected with the regulator R through a fluid line Y. The bulb V is connected with the safety valve S through fluid line Z.

Numeral 1 (FIGS. 2 and 3) indicates a hollow housing formed of body 3 and cover 5, held together by screws 7. At numeral 9 (FIGS. 4–6) is shown a gas inlet which communicates with a conical valve seat 11 in body 3. An inlet fitting 12 (FIG. 1) connects inlet 9 with the gas main M. The small end 13 of conical seat 11 communicates with a main passage 15, which in turn communicates through a threaded outlet 17 with a compartment 19, the latter communicating with a main gas outlet 21 through a passage 22. The gas outlet 21 is connected by pipe 23 (FIG. 1) with the valve S.

At numeral 25 (FIGS. 2, 10 and 11) is shown an outlet valve seat having a tubular threaded part or bushing 27 threaded in the opening 17. Part 27 has an annular groove as shown at 29 and contains a spider 31 against which a coil spring 33 is seated. The spider 31 contains openings 35. It also carries a hollow forwardly extending tubular part 37 which, through passage 39 in the spider 31, is in communication with groove 29. At the end of tube part 37 is a second valve seat 41 which is formed in the plane of seat 25. Extending oppositely from spider 31 is a cylindrical extension 43 carrying a pin 45 which slides in slots 49 of a sleeve 47.

A double-walled cup 51 is located in the compartment 19. It has an inside cup-shaped wall 53 and an outside cup-shaped wall 55, the latter being soldered or otherwise attached to the cover 5. The marginal portions 57 of the cup members 53 and 55 are sealed together as by welding or soldering, the remaining portions of the members 53 and 55 being unjoined. They are corrugated in their portions forming the inside bottom 59 of cup 51. The outside member 55 is provided with an opening 61, communicating through cover 5 with line Y. Line Y is sealed to the cover 5 and extends to the bulb L located in the space to be heated.

The bulb L, line Y and available space between the bimetallic members 53 and 55 are filled with a thermally responsive fluid which is adapted upon expansion in response to heating to enter between the members 53 and 55 for forcing them apart. This drives the bottom of the inside wall 53 to the left away from the bottom of outside wall 55 as shown in FIGS. 10 and 11. The inside wall 53 engages a drive member 63 which has a sliding engagement with a stud 65. The stud 65 has an end portion 66 which is staked into the dished center of an auxiliary safety valve member 67. A plurality of screws 68 (FIGS. 2 and 10–13) have shank portions which loosely pass through holes in valve member 67 into tapped holes 69 into a movable main control valve 71. The head 70 of each screw 68 is engageable by the right-hand surface of auxiliary valve member 67 (FIGS. 2 and 10), thereby limiting movement of valve member 67 away from main valve 71. There are gas ports or holes 72 through the main valve 71 (FIGS. 12 and 13).

Valve 71 has a peripheral portion 73 engageable with seat 25 and a central portion 75 simultaneously engageable with seat 41. When valve members 67, 71 are separated and main valve 71 is seated against valve seat 25 (FIG. 10) gas may pass from inside the tubular part 27, through holes 72 and between the valve members 67, 71 into compartment 19 for delivery to the main gas outlet 21. When valve members 67, 71 are in face-to-face engagement (FIG. 11) valve member 67 covers ports 72 to close off this path for gas flow.

A spring rosette 77 has an annular central portion which engages the left end of the drive member 63. Its central portion and the drive member 63 are slidable on stud 65. Spring fingers 78 of the spring rosette 77 contact and press against main valve 71 beyond the margin of auxiliary valve member 67. Since valve member 67 is attached to stud 65, the spring rosette not only biases the main valve 71 toward seats 25 and 41 but also tends to hold the main valve and auxiliary valve member 67 separated. After main valve 71 engages seats 25 and 41 due to thermostatic expansion of the fluid between the cup members 53, 55 and the biasing force of the rosette 77, any further expansion of the fluid between the cup members to drive stud 65 to the left compresses a helical spring 79 between auxiliary valve member 67 and the central portion of the rosette. Spring 79 then biases valve member 67 toward valve 71 to reduce the gap between them until they are in contact, at which time flow of gas is stopped through holes 72 into chamber 19. When the space between the cup members contracts due to cooling of fluids therein, gas can flow to chamber 19 first through holes 72 and then between seat 25 and main valve 71. Movement of the valve 71 to the left is opposed by the coil spring 33 which reacts from the spider 31 against the valve 71, biasing the valve toward its open position (FIG. 2). Upon heating, the reverse action occurs as the valve 71 moves toward its closed positions.

Gas normally is provided to line X from groove 29 in bushing 27 through auxiliary passages 80, 82 and 84 and through outlet 86. Gas line X leads to the cycling pilot burner I (FIG. 1). Flow between groove 29 and line X is adjustable by means of an adjusting valve 88.

Figure 4:
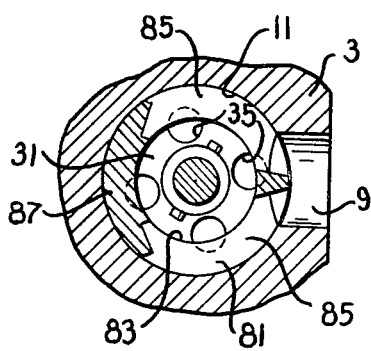
FIG. 4 is a fragmentary section taken on line 4—4 of FIG. 2 showing a manually controlled plug valve in a bake setting according to said FIG. 2.
Figure 5:
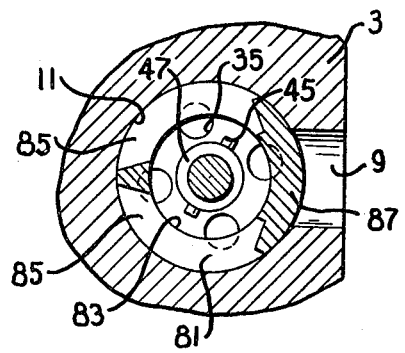
FIG. 5 is a section similar to FIG. 4 showing the plug valve rotated 180° to close the gas inlet of the valve.
Figure 6:
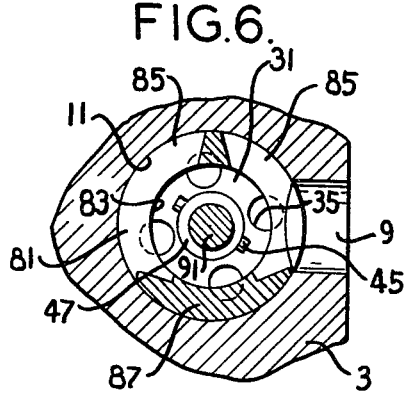
FIG. 6 is a section similar to FIGS. 4 and 5 showing the plug valve in a broil position.

At 81 is shown a manually controlled cup-shaped conical plug valve which acts as a gas admission control valve. It is located in the conical seat 11 (FIGS. 2 and 4–6). This valve had a hollow center 83 communicating with the main passage 15. The hollow center 83 communicates with valve seat 11 and inlet 9 through passages 85. This leaves a solid portion 87 of the valve 81 for closing inlet 9 as shown in FIG. 5.

Figure 7:
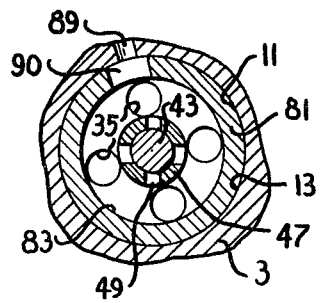
FIG. 7 is a section taken through the small end of the plug valve when it is in the FIG. 6 or broil setting.

At 89 is shown a bypass passage which extends from the small end portion of valve seat 11 to the auxiliary passage 80. Valve 81 has a hole or port 90 (FIG. 7) in its smaller end which can be placed in register with passage 89. Thus when the solid portion 87 of valve 81 is located in one position (the broil position shown in FIGS. 6 and 7), there is communication from inlet 9 through valve 81, port 90, passages 89, 80, 82 and 84 and through outlet 86 to the line X, thereby bypassing the thermostatically operated valve parts 25, 41 which normally control flow of fuel to the line X.

FIG. 5 shows conical valve 81 positioned in seat 11 with its solid portion covering inlet 9, thereby closing off communication between the gas main M and both the main outlet 21 and the auxiliary outlet 80. FIGS. 2–4 show the valve 81 after a suitable counterclockwise adjustment from its FIG. 5 position to a bake setting. At this adjustment seat 25 (FIG. 2) has been backed off to the left by action of the threads between 17 and 27. Inlet 9 at this time communicates through valve 81 with passage 22 leading to the main gas outlet 21 and auxiliary passages 80, 82 and 84 leading to auxiliary outlet 86 when the thermostatic valve 71 is open to permit gas flow past seats 25 and 41. Inlet 9 also communicates with passage 22 through the holes 72 in valve 71 when the auxiliary valve member 67 is spaced from valve 71. At this setting of valve 81 (bake setting) the bypass 89 is closed by the solid part 87 of valve 81. Burner B is then regulated by the thermostatic valve 71 and auxiliary valve member 67 which regulate gas flow to both lines X and 23 in response to oven temperatures as sensed by expansion of fluid in bulb L and line Y. Initially valve 71 moves to the left until it engages seats 25 and 41, thereby closing off gas flow through passages 39, 80, 82 and 84 and through outlet 86 to line X, which shuts off the intermittent pilot I. This decreases heating of bulb V, thereby regulating gas flow through valve S to modulate burner B. Normally valve S will open and close as pilot I is lit and extinguished, thereby providing on-off operation of burner B. This on-off operation is desirable for bake settings of the oven.

The preceding description of operation in the bake range of dial settings assumes that valve S will close when valve 71 engages seat 41 to shut off pilot I. However, valve S may fail to close for some reason. Because gas can flow through holes 72 in valve 71 and between valve members 71 and 67, gas can still be provided through passage 22 to the main outlet 21 and then through line 23 to valve S. Therefore, if the valve S does not close for any reason, gas continues to be provided to burner B to raise the oven temperature above the dial setting. However, upon such further increase in oven temperature there is a corresponding expansion of the fluid in bulb L and line Y which moves the auxiliary valve member 67 toward valve member 71 until they contact (FIG. 11) to shut off gas flow through holes 72. This movement of valve member 67 until it contacts valve 71 may be accomplished upon an oven temperature rise of approximately 65° F. (for example) above the dial setting. In the absence of the auxiliary valve member 67, oven temperature would continue to rise and destroy the contents of the oven.

At settings of valve 81 in the broil setting (FIGS. 6 and 7) seat 25 is backed off to the left by the action of threads 17 and 27 and even greater distance than for bake settings. At this time inlet 9 communicates through valve 81 and the valve members 67 and 71 with the passage 22 leading to the main gas outlet 21. Simultaneously, the inlet 9 communicates with the line X through auxiliary passages 80, 82 and 84 and outlet 86, either by direct communciation through port 90 in the small end of valve 81 and auxiliary passage 89, or by passing between valve 71 and seat 41. This direct communication through port 90 and passage 89 bypasses the normal thermostatic action of valve 71 at seat 41 to maintain the cycling pilot on at all times, thereby keeping the flame detector control valve S open. Thermostatic control for burner B is accomplished in this setting through throttling of the main gas supply, first by moving valve 71 to the left until it contacts seat 25 (FIG. 10) and then by reducing and enlarging the gap between valve 71 and the auxiliary valve member 67. As the auxiliary valve member 67 approaches valve 71 the volume of gas provided to the main burner is sufficiently reduced so that the oven begins to cool off, thus cooling bulb L and separating valve member 67 from valve 71. This modulation of burner B (as opposed to on-off operation) is desirable in the broil setting for reasons above stated.

Extending through the conical plug valve 81 is a control stem 91, in the right end of which is a pin 93 which projects through sleeve 47. Thus when the control stem 91 is turned, the threaded bushing 27 is also turned and axial positions of the valve seats 25 and 41 may thus be changed relative to the range of thermostatic movement of the valve 71.

Figure 8:
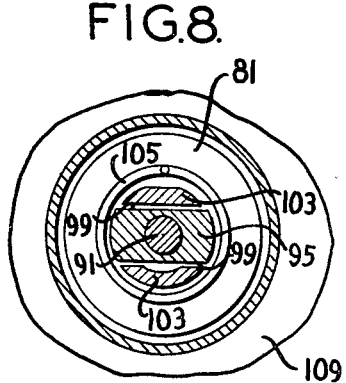
FIG. 8 is a fragmentary section taken on line 8—8 of FIG. 2.

The large end of the conical valve 81 is provided with a hollow stem 95 through which stem 91 is threaded. The threads are tight enough to carry stem 95 with valve 81 upon normal rotation of the valve but permit the stem to be turned relative to the valve by a screw driver in the slotted end of the stem when the valve is held against rotation. This is for adjusting purposes. Control stem 91 extends through the hollow valve stem 95 and out beyond its left end (as viewed in FIG. 2). Hollow valve stem 95 has flat surfaces 99 (FIGS. 2 and 8). A coupling 101 has forked projecting flanges 103 straddling valve stem 95 for conjoint rotation of the parts. Flanges 103 have a sliding connection with stem surfaces 99. A spring 105 reacts from the left end of plug valve 81 against coupling 101, biasing the coupling 101 away from the plug valve. Coupling 101 also has flanges 107 (FIGS. 2 and 9) which project from its end opposite from valve 81.

A hollow stepped cover 109 attached to valve body 3 by screws 111 encloses the outer end of control stem 91. A hollow cylindrical connector 113 projects through cover 109. A snap ring 115 on connector 113 limits inward movement of the connector into the cover by engagement with the left end of cover 109. The inner end of connector 113 is slotted to provide spaced flanges 117 which cooperate with flanges 107 on coupling 101 for turning the coupling (and thus valve 81) with the connector. A ring 119 (FIGS. 2 and 9) attached to the right end of connector 113 engages a shoulder 121 on cover 109 for limiting movement of connector 113 and coupler 101 to the left as viewed in FIG. 2. Stops 123 and 125 on the ring 119 and cover 109, respectively, limit rotation of the connector to less than 360°.

Figure 9:
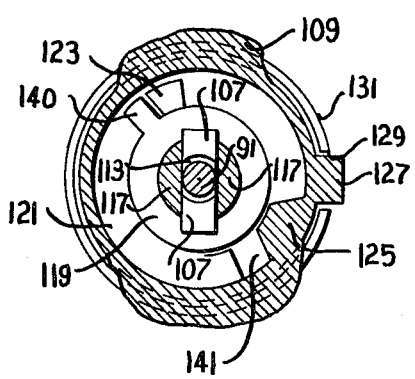
FIG. 9 is a fragmentary section taken on line 9—9 of FIG. 2.

At 127 in FIG. 9 is shown a key on cover 109 which is received in a keyway 129 in the stem of a dial housing 131. A dial 133 has in its inner surface a generally semi-cylindrical cavity 135 (FIG. 2). The outer end of connector 113 is partially cut away at 137 and has a press fit into cavity 135 in dial 133 for mounting the dial on the connector. A spring 139 reacts from the dial housing against the dial, thereby biasing the dial toward the left as viewed in FIG. 2. The pressure of spring 139 is not sufficient to force dial 133 off of connector 113.

A portion of the stop 123 on ring 119 is bent out of the plane of the remainder of the ring to form a latching ear 140 (FIG. 9) adapted to be received in a notch 141 in the shoulder 121 of cover 109 when the dial is at its off position. The dial spring 139 biases dial 133, connector 113 and ring 119 toward the left (as viewed in FIG. 2) to force ear 140 into the notch. Thus the dial will not be inadvertently turned to an "on" position. However, the dial may be easily turned to an "on" position by pushing in the dial against dial spring 139 to move ear 140 from notch 141 and then rotating the dial in a counterclockwise direction as viewed in FIG. 3. Inward movement of the connector 113 is limited by the snap ring 115.

Operation is as follows:

Baking operation will first be considered. Assuming the dial 133 is in the off position, then plug valve 81 is located as shown in FIG. 5 with the solid part 87 across fuel inlet 9, thereby blocking entrance of gas from the main M into the valve. Pilot burner P is continuously supplied with gas from main M through gas line W so that it continuously burns after initial manual ignition.

Assume the oven is cold and it is to be heated for baking. The dial 133 is first depressed and then moved in a counterclockwise direction initially to place the parts at the desired setting in the bake range of valve openings (such as shown in FIGS. 2–4), at which the oven temperature is to be maintained by on-off burner operation. In this adjusting step the seats 25 and 41 are backed off toward the left. The amount depends upon the baking temperature desired (say 425° as shown on FIG. 3). Inlet 9 is at this time open, permitting gas to flow from main M into plug valve 81 through openings 85 and from there it will flow along two routes. On one route it flows to passage 15, then through passage 22 to the main gas outlet 21. Simultaneously, gas from valve 81 is provided through holes 72 in valve 71 into passage 22 for delivery to the main gas outlet 21. From main outlet 21 gas flows to valve S and, when it is open, to burner B where it is ignited from main pilot P for heating the oven.

Simultaneously, gas from valve 81 passes through bushing 27 and across valve seat 41 to conduit 39 and into groove 29 in the bushing. This gas is supplied through passages 80, 82 and 84 to the auxiliary outlet 86 and, through gas line X, to the intermittent pilot I were it is ignited by pilot P. Pilot I heats bulb V and, by expansion of fluid in bulb V and line Z, valve S is opened for passing gas from the main outlet 21 to the burner B.

When bulb L is cool, valve member 71 is separated from seat 25 by some distance (FIG. 2), permitting a flow of gas to pass seat 25. As bulb L heats, the valve member 71 moves to the left, as viewed in FIG. 2, to approach seat 25, thus restricting or throttling the volume of gas to the burner through this structure. When the oven reaches the desired temperature, the thermostatic valve structure simultaneously closes seats 25 and 41, respectively, as shown in FIG. 10. While this shuts off supply of gas past seat 25, gas can still flow to the burner B through holes 72 and between valve 71 and valve member 67. However, closing of valve seat 41 shuts off the flow of gas to the intermediate cycling pilot I. Bulb V then cools, thereby closing valve S which shuts off the flow of gas to burner B. As the oven temperature decreases, the valve 71 reopens to permit gas flow past seats 25 and 41, thus reigniting pilot I for reopening valve S to supply fuel to burner B for heating the oven. Thus during normal operation in the baking range of temperatures, desirable on-off regulation of burner B results.

If control valve S fails to close due to a malfunction, gas continues to be supplied to burner B through holes 72 and the space between valve 71 and the auxiliary valve 67. The resulting heating in the oven further expands the fluid in bulb L and moves the cup 53 further to the left. This forces the center portion of spring rosette 77 against the spring 79 to compress the spring and bias auxiliary valve member 67 toward valve 71 to throttle flow of gas through the valve into passage 22. This reduces the rate of gas flow to burner B and thus reduces the rate at which the oven is heated. After some initial fluctuation in oven temperature, mean equilibrium temperature is reached. The equilibrium temperature may be about 65° F. above the dial setting, for example. In the absence of the modulation provided by auxiliary valve 67, the oven temperature would continue to increase without control if valve S did not close.

Next broiling operation will be considered. Dial 133 is moved to the broil setting by turning it about 270 compass degrees counterclockwise from its off position. This further retracts seat 25 and moves the plug valve 81 to the position shown in FIGS. 6 and 7, in which gas inlet 9 is open and bypass passage 89 is in communication with the gas inlet through port 90 in the small end of valve 81. Thus fuel is provided for outlets 21 and 86 between seats 25 and 41 and fuel is also provided to outlet 86 through the bypass passage. As the temperature in the oven increases during broiling, valve member 71 moves to the left until it engages seats 25 and 41 (FIG. 10). This shuts off gas flow to passage 80 through passage 39. However, gas continues to flow to the intermittent pilot I through port 90 and the auxiliary passage 89. Pilot I heats bulb V to keep valve S open. The fluid in bulb L and line Y expands and contracts with temperature changes in the oven to move auxiliary valve member 67 toward and away from valve 71, thereby varying the gap between these members to throttle flow of gas to main outlet 21 through holes 72 in valve 71. This reduces the rate at which gas is provided to burner B, and reduces the rate at which the oven is heated. While the gas supplied to the intermittent pilot I is reduced, it is not cut off. Bulb V in this range always remains sufficiently heated to keep valve S open. An approximate equilibrium temperature is reached before auxiliary valve member 67 closes on valve 71. In this manner continuous regulation of gas flow is obtained under broiling temperatures without extinguishing burner B. This permits the burner flame to consume any resulting smoke.

Any cooling of the oven from the desired equilibrium condition is sensed by bulb L, which moves auxiliary valve member 67 to the right gradually to increase the opening between the valve members 67 and 71 to increase the volume of gas ultimately delivered to burner B. Larger modulating movements of the thermostatic valve members occur principally when regulator R is first moved to the broil setting. The amount of modulating movement decreases until the stated approximate equilibrium condition is reached at about 600° F., for example. Thereafter modulating movements are quite small, resulting in so-called straight line modulation.

In view of the above it will be seen that desirable on-off regulation of burner B occurs in the bake range of settings when the valve S is properly functioning. However, if valve S fails to close when the dial is in the bake range of settings or if the dil is set to the broil setting, then thermostatic valve structure modulates without shutting off the burner B.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. A fail-safe gas regulating system comprising a burner, a gas-enclosing body, a continuous pilot and a cycling pilot for the burner, a safety valve for conveying gas to said burner from said body, regulator means contained in said body under burner temperature control for feeding gas to the cycling pilot and to said safety valve, a by-pass extending around said regulator means, a manual gas admission control valve operative in conjunction with the regulator means for controlling flow of gas through said regulator means and through the by-pass to the cycling pilot, a hollow bushing threaded in said body for axial movement when said manual control valve is turned to admit gas to the body, said bushing being formed with two valve seats through one of which upon a predetermined adjustment of the manual control valve gas flows through said body and to said safety valve and through the other of which gas flows through the by-pass and to said cycling pilot to supply gas to the by-pass, whereby flow of gas through the safety valve may be modularly or cyclically controlled, a first valve member in said regulator means having port means and engageable and disengageable simultaneously with said seats, a second valve member having a lost-motion connection with the first valve member and movable to open and close said port means in the first valve member, an expansible chamber, expansible fluid means heated by the burner and connected with said expansible chamber, first and second spring means connecting a movable part of the expansible chamber with the first and second valve members respectively and arranged first to close the first valve member at one temperature caused by the burner and thereafter to close the second valve member at a predetermined but safe higher temperature caused by the burner.

References Cited

UNITED STATES PATENTS

| 2,831,504 | 4/1958 | Coffey | 137—630.19 X |
| 3,090,560 | 5/1963 | Holzboog et al. | 236—15 |
| 3,118,471 | 1/1964 | Wright | 137—630.19 |
| 3,167,250 | 1/1965 | Wantz et al. | 236—68 |
| 3,212,712 | 10/1965 | Hildenbrandt | 236—68 X |

ROBERT A. O'LEARY, *Primary Examiner.*

W. E. WAYNER, *Assistant Examiner.*